United States Patent [19]
Piotrowski

[11] 3,964,616
[45] June 22, 1976

[54] MACHINE TOOL INTERCHANGE ARM

[75] Inventor: Tadeusz Wiktor Piotrowski, Cincinnati, Ohio

[73] Assignee: Cincinnati Milacron, Inc., Cincinnati, Ohio

[22] Filed: Sept. 29, 1975

[21] Appl. No.: 617,960

[52] U.S. Cl. .............................. 214/1 BD; 29/568; 294/115
[51] Int. Cl.² ..................... B23Q 5/32; B23Q 3/157
[58] Field of Search ................ 29/568; 294/88, 115; 214/1 BE, 1 BD

[56] References Cited
UNITED STATES PATENTS
3,722,711  3/1973  Seidel .............................. 214/1 BD

*Primary Examiner*—Othell M. Simpson
*Assistant Examiner*—Z. R. Bilinsky
*Attorney, Agent, or Firm*—Thomas M. Farrell

[57] ABSTRACT

An interchange arm to transfer tools between a tool storage mechanism and a spindle. A pair of the interchange arms are pivoted on rotating shafts of a tool changer mechanism which rotates the arms between the spindle and the tool storage mechanism so that the arms can securely hold and positively locate the tools which are interchanged during the interchange time, and the tool gripping member and locating members are automatically retracted from the tools when the tools are deposited in their respective holding receptacles. A unique gripping arrangement releasably connects the tools to the arm, using a minimal amount of space for getting on and off the tool, and the tool gripping finger mechanisms are self-locking about the tool under the influence of centrifugal force acting on the tool during the interchange interval, to assure a more positive grip on the tool.

2 Claims, 9 Drawing Figures

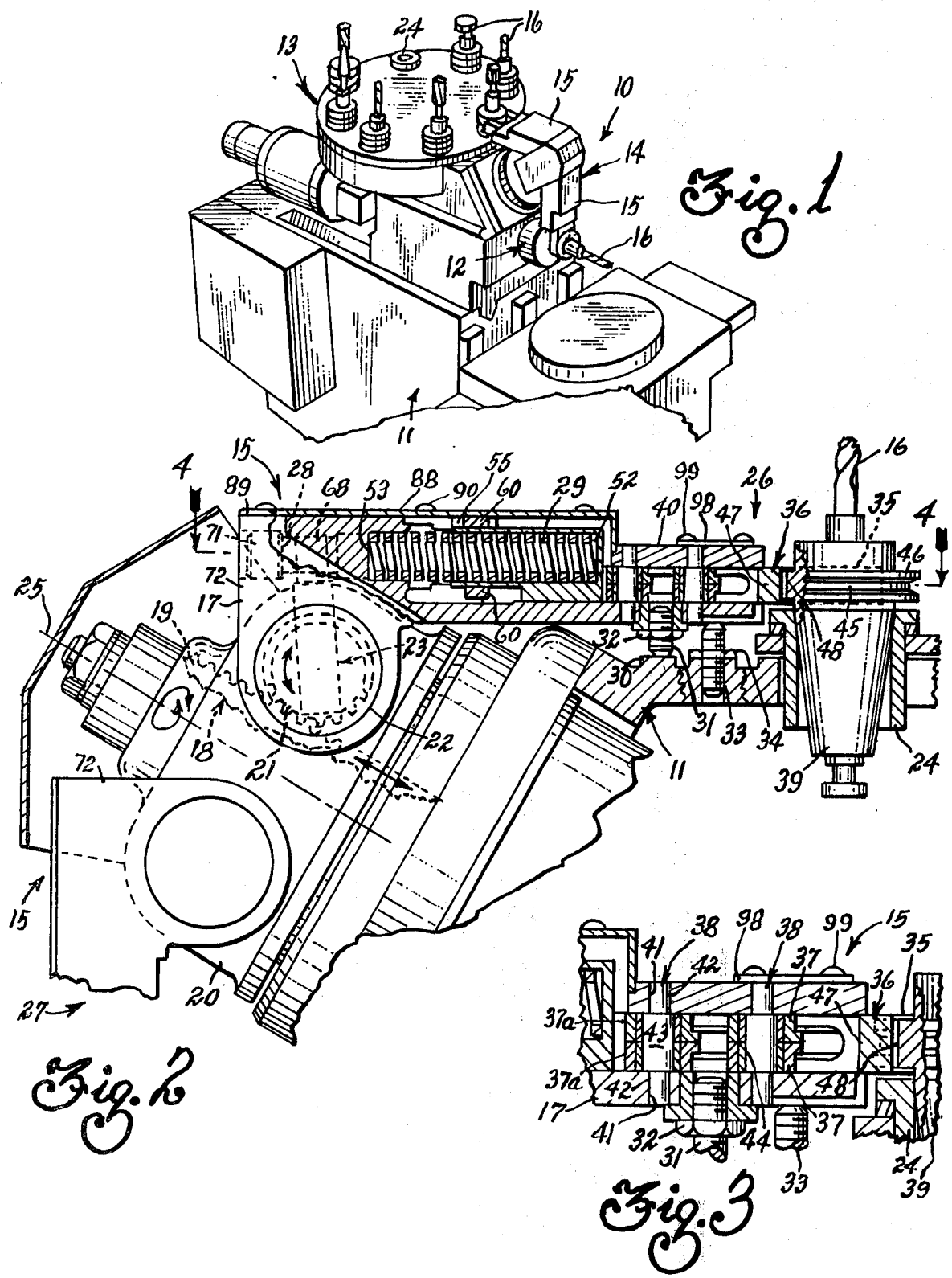

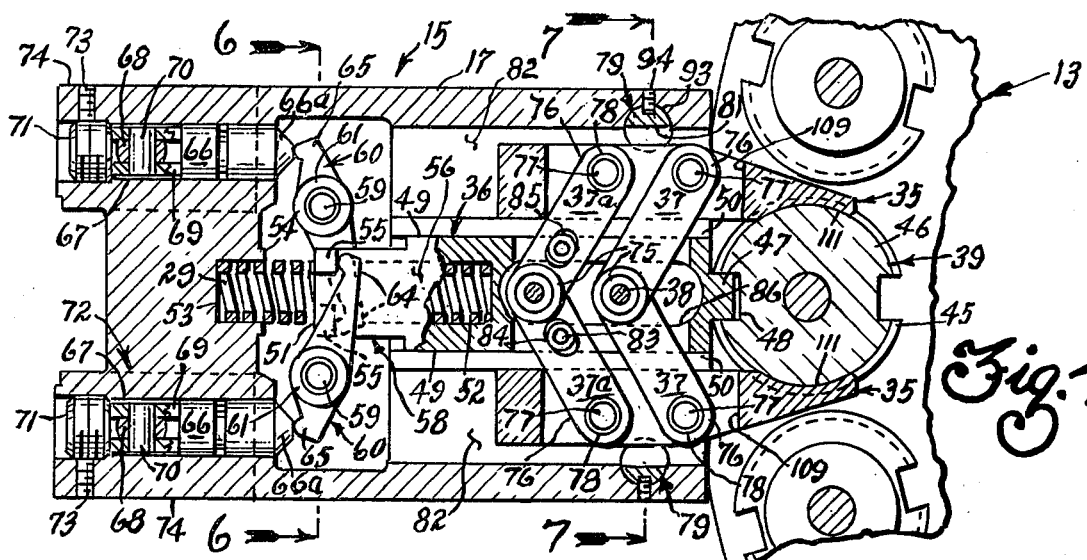
Fig. 4
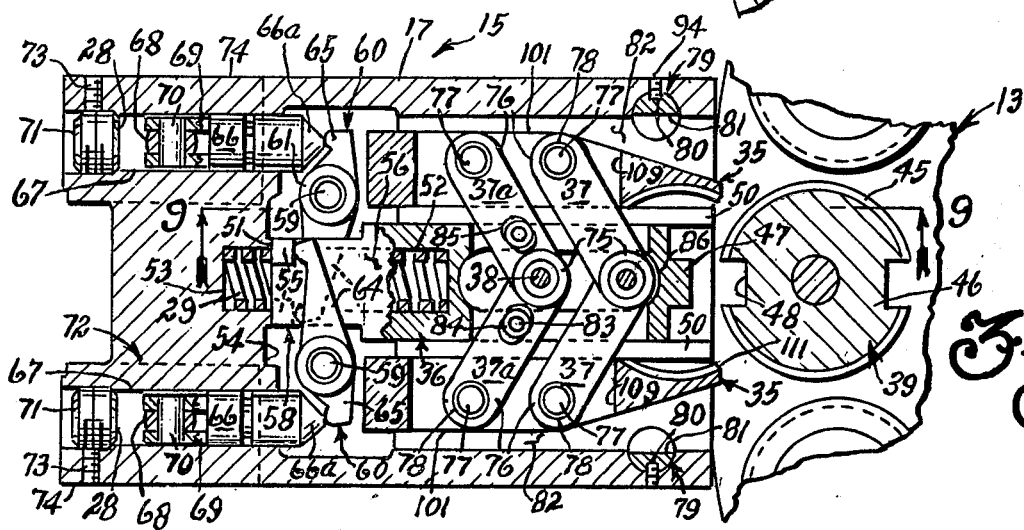
Fig. 5
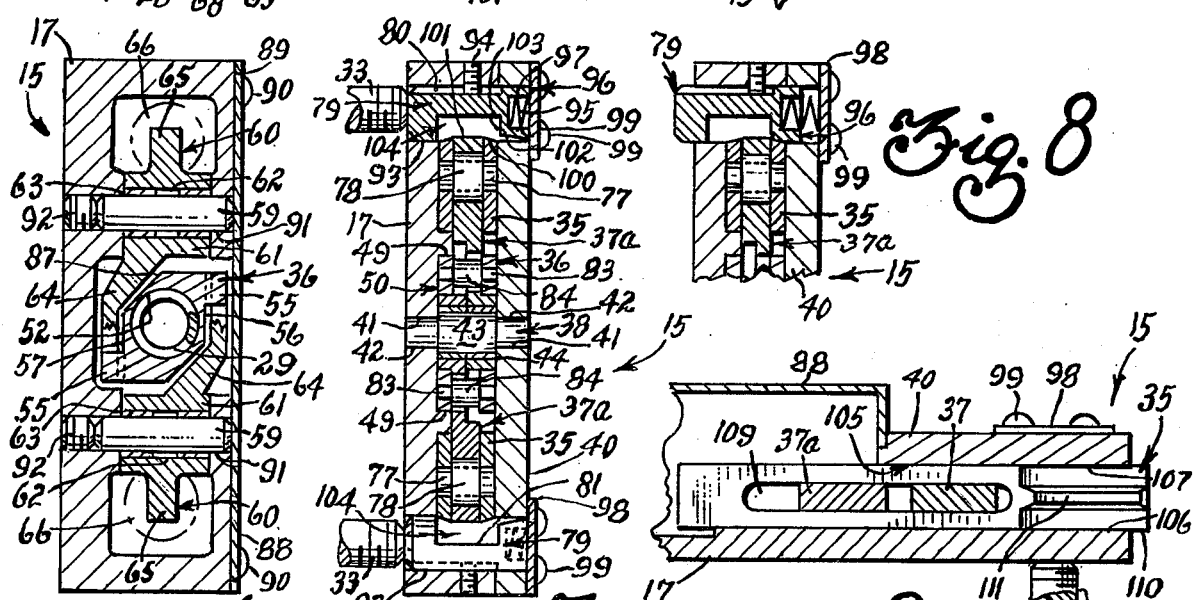
Fig. 6　Fig. 7　Fig. 9
Fig. 8

MACHINE TOOL INTERCHANGE ARM

BACKGROUND OF THE INVENTION

In the toolchanger described in U.S. Pat. No. 3,803,704 of Seidel, and other similar toolchange mechanisms, it is very desirable to have a smooth, efficient, positive method for gripping the respective tools during an interchange. The grippers employed on the interchange arms of the aforementioned U.S. Patent grip the tools within a circumferential groove which is machined around a flange on the respective tool holders. The flange, which must be machined, creates additional overhang even in its minimal form; while the tool gripper must be made still smaller than the gripping groove so that the next succeeding tool may be passed across the grippers for its turn at being interchanged.

While the motions provided in the tool changer described are very smooth and successive in function, it is believed that the tool grippers and arm mechanism may be improved upon by gripping in an annular groove turned around the flange on the tool holder by a pair of "pincers" which will cause a more stable control of the tool holder during an interchange moment because of the opposing gripping surfaces on the diameter of the flange rather attempting to grip the part on one side of the flange only, as with the internal grip, thus allowing the tool holder to experience an instability.

Further, the majority of tool holders employed have keyways cut in their flange to provide a torque couple to a complementary key which is affixed to the spindle nose. On these type of tool holders it is most imperative that the keyway be closely controlled during its interchange path so that the spindle key may engage the keyway without interference.

Applicant believes that by using the existing output motions of the aforementioned U.S. Patent, his invention will provide a superior gripping device for tool holders and a simultaneous positioning device to orient the keyways of the tool holder while in transit.

It is therefore an object of the present invention to provide a tool interchange arm capable of imparting a high degree of stability to a tool holder when being automatically interchanged on a machine tool.

Another object of the present invention is to provide an orienting device which will cooperate smoothly with the tool gripping mechanism while in use, during transit, and which will automatically be retracted with the tool grippers when not in use.

SUMMARY OF THE INVENTION

This invention comprises an interchange arm for use on a machine tool automatic tool changing mechanism which has gripping jaws to carry the tool holder during transit and a simultaneously actuated key centrally located between said grippers to orient the tool holder keyways.

When in transit, the tool grippers are advanced out of the end of the tool arm into a grip position about the flange of the tool holder and at the same time, a key block is advanced into the keyway of the tool holder. The grippers are supported on parallel links so that they are translated along a path from a retracted position into an advanced position by spring force. When the tool interchange arm comes to a final rest and deposits a tool holder in either a tool storage pocket or in the spindle nose of the machine tool, additional motion within the tool arm caused by the transport mechanism which carrys the tool arm, exerts force against a pair of levers within the tool arm, which levers are pivoted and have their opposing ends engaging lugs on the key blocks so as to transmit force against the block, thereby compressing the spring, retracting the block from the keyways, and simultaneously (through pin and slots) retracting the parallel linkages which support the part grippers thereby retracting the part grippers.

In this fashion, therefore, when the arm has finally come to rest at the end or beginning of an interchange interval the orienting key block is retracted into the arm housing as well as are the part grippers.

Thereafter, as it becomes necessary to reactivate the arm, reverse gear movement activates the arm through an interchange path causing a relaxation of the holding force on the spring and the grippers and keyblock advance once again to securely hold the tool holder.

DESCRIPTION OF THE DRAWINGS

FIG. 1 is an isometric view taken of a machine tool having a work spindle, tool storage mechanism, automatic tool changer and associated tools.

FIG. 2 is a section through the arm of the tool changer of FIG. 1.

FIG. 3 is an enlarged section through the tool holding end of the arm of FIG. 2.

FIG. 4 is a plan section taken along the line 4—4 of FIG. 2 showing part grippers advance onto a tool holder.

FIG. 5 is a plan section as in FIG. 4, with part grippers retracted from a tool holder.

FIG. 6 is a transverse section along the line 6—6 of FIG. 4.

FIG. 7 is a transverse section taken along the line 7—7 of FIG. 4.

FIG. 8 is a section as in FIG. 7 showing the interference pin extended.

FIG. 9 is a section taken along the line 9—9 of FIG. 5.

DESCRIPTION OF THE PREFERRED EMBODIMENT

Referring now to FIG. 1, there is shown a machine tool 10 having a toolhead 11 with a rotatable work spindle 12 carried therein and further having a tool storage mechanism 13 mounted on the toolhead 11 and an automatic toolchanger 14 is mounted to the toolhead 11, having arms 15 to transfer tools 16 between the tool storage mechanism 13 and the spindle 12.

FIG. 2 is a section through an arm housing 17 of the toolchanger 14 of FIG. 1, employing a mechanism 18 within the toolchanger 14 similar to that disclosed in U.S. Pat. No. 3,803,704 of Siedel, which employs a slidable rack 19 along the pivot axis of the changer head 20 which is engaged with a pinion 21 which is rotatably mounted in the changerhead 20, having a trunion portion 22 at each end about which is journaled the toolchanger arm 15. In this manner, as the rack 19 is positioned along its axis, rotational movement is imparted to the pinion 21 and trunion portion 22 and the subsequent torque exerted on the pinion 21 is imparted to the arm 15 by means of a drive pin 23 secured in the trunion portion 22 and radially extending into the arm housing 17. Thus, the arm housing 17 may be pivoted about the trunion axis to lift a tool 16 out of a tool pocket 24 and, thereafter, the changerhead 20 is pivoted around its own central axis 25 which changes the tool from a first position 26 proximate to a toolholder pocket 24 to a second position 27 proximate to a work spindle 12.

When viewed as in FIG. 2, counterclockwise motion exerted on the trunion portion 22 causes the drive pin 23 to drive solidly against a shoulder in the arm 15 to lift the tool 16 out of the pocket 24 and swing it in a counterclockwise direction. However, when torque is applied in the clockwise direction, the drive pin 23 is working against the compressed force of the spring 29 (through lever actions which will be discussed in regards to FIGS. 4 and 5), so that the arm may be powered in a clockwise direction to position the arm 15 in the first, or "rest" position 26 against a solid rest button 30 through an adjusting screw 31 and nut 32 provided in a threadable bushing received in the arm for this purpose, and a rest button 30 is provided on the machine toolhead 11 to function as a positive stop. A detent release screw 33 and nut 34 assembly is further provided in the toolhead 11 and adjusted to such a position that as the arm 15 reaches the "rest" position 26, the jaws 35 will be unlocked.

FIG. 2 further shows the pinion 21 and drive pin 23, which is capable of driving in a clockwise direction under torque in such manner that after the arm has been driven to a "rest" position 26, the trunion portion 22 may be rotated through a still further increment of "overtravel" so that the drive pin 23, through lever action, may compress the spring 29 still further, thereby retracting the slidably mounted keyblock 36, and the keyblock 36 will pull the links 37 about their link pivot pins 38 to translate the jaws 35 to a retracted position away from the toolholder 39.

FIG. 3 is enlarged section showing the arm housing 17, the slidable keyblock 36, and the housing cover plate 40, wherein the housing cover plate 40 and the housing 17 are fitted with concentric bores 41 to hold cooperating diameters 42 of the link pivot pins 38. The pivot pins 38 have a still larger mid-axis portion 43 around which are journaled the links 37 which have bearings 44 centrally therein to bear on the pivot pins 38.

FIG. 4 is a plan section taken through the arm 15 of FIG. 2 showing the jaws 35 gripped around a circumferential groove 45 which has been provided on a toolholder shank 46. The slidably mounted keyblock 36 is shown in position having its key nose 47 engaging a corresponding keyway 48 in the toolholder shank 46 to provide angular orientation of the toolholder 39 during an interchange time. The keyblock 36 has parallel sides 49 which guide the block 36 in a smoothfitting track portion 50 which has been cut into the arm housing 17. The rear end 51 of the key block 36 has a bore 52 provided therein and an opposing bore 53 is provided in the inward wall 54 of the housing. A compressed spring 29 is inserted within the two bores 52, 53 such that the compressive force of the spring 29 urges the key block 36 into engagement with the toolholder 39 and away from the housing wall 54. Lugs 55 are provided on the top and bottom surfaces 56, 57 of the rear portion 58 of the key block 36, and lever pivot pins 59 are provided in the housing 17 near the rear end portion 58 of the key block 36. The lever point pins 59 each pivotally carry a lever 60 which has a thick central portion 61 with a bore 62 therethrough and bushings 63 provided therein to journal on the pivot pin 59. An inner lever portion 64 is shown contacting a lug 55 on the key block 36, and an outer lever portion 65 is shown contacting a slidable clevis pin 66 in the housing 17.

The clevis pin is slidable in a bore 67 in the housing 17 and is clevis-mounted to the upper end 68 of the drive pin 23, by a yoke portion 69 surrounding the drive pin 23 and having a pin 70 therethrough to permit rotation of the drive pin 23 about the pin 70 while driving the clevis pin 66 back and forth in its bore 67. Stop screws 71 are provided in the journaled end 72 of the housing 17 to provide a solid driving shoulder 28 for the drive pin 23, and the stop screws 71 are clamped in position by set screws 73 extending from the outer sides 74 of the housing 17.

The links 37 are shown with their inboard ends 75 journaled on the housing-fixed stationary pivot pins 38, and their outer ends 76 journaled on the jaw pivot pins 77, while bushings 78 are provided in the outer ends 76 to journal the links 37 about the jaw pivot pins 77. The links 37 are all of the same size, and when viewing one jaw 35, it may readily be seen that it is mounted on a pair of parallel links 37, such that as the links 37 are pivoted in unison, the jaw 35 will be carried in the same attitude, relative to the keyblock 36, as it is retracted into the housing 17. The detent pin 79 is shown at a retracted position, guided on its key slot 80, wherein the relief portion 81 in the detent pin 79 is aligned with the jaw track 82 in the housing 17. A retracting pin 83 is provided in the key block 36 which has a roller 84 mounted thereon which engages a slot 85 in the rear links 37a, and a relief slot 86 is provided along the axis of the key block 36 so that the key block 36 may slide back and forth without interfering with the link pivot pins 38. Thus, it can been seen that when the keyblock 36 is retracted, the retracting pin 83 and roller 84 will pull the rear link 37a through a counterclockwise arc, and the front link 37 will follow through an identical arc, thereby translating the jaw 35 to a retracted position through the housing jaw track 82.

The function of the elements shown in FIG. 4, may be still further understood when referring to FIG. 5, which shows the jaws 35 in a retracted position. This position is one which occurs when the trunion portions 22 are driven through an "overtravel increment" as discussed previously, wherein the clevis pins 66 are driven forward out of the housing bore 67 (the housing 17 has been restrained in the "rest" position), and the nose 66a of the clevis pin 66 drives the outer lever portion 65 of the lever 60 forward, which results in the inner lever portion 64 of the lever 60 being driven rearward, bearing on the lugs 55 of the keyblock 36. In this manner, the keyblock 36 is retracted, thereby compressing the keyblock spring 29 and causing the rear portion 58 of the keyblock 36 to abut the housing wall 54. The keyblock 36, in its retracted position, shows the clearance slot 86 which is provided around the link pivot pin 38 and the retracting rollers 84 have jerked the rear links 37a through a counterclockwise arc, with the front links 37 following, returning the jaws 35 to a retracted position with the keyblock 36.

It can be understood therefore, that when the arm 15 is to go through an interchange movement, the first part of angular movement of the trunion portion 22 will return the clevis pin 66 to a position against the stop screws 71, and this reversing movement will return the jaws 35 to a clamped position about the tool shank 46 diameter as shown in FIG. 4. During this first small interval of movement, the arm 15 is still stationary in its "rest" position. Thereafter, as further movement is continued to draw the clevis pins 66 rearward, the pins 66 will bottom against the stop screws 71, and the arm 15 and the now-advanced jaws 35 with their gripped toolholder 39 will be lifted through a toolchange interval.

FIG. 6 illustrates the pivot pins 59 for the levers 60, and the levers 60 have their inner lever portions 64 reaching around the body 87 of the keyblock 36 to contact their respective lugs 55. The clevis pin 66 is shown (in phantom) in position with the outer lever portion 65 of the lever. The keyblock spring 29 is shown in its bore 52 centrally located within the keyblock body 87. A cover plate 88 is provided on the topmost surface 89 of the arm housing 17 and the cover plate 88 is held in position with screws 90 to provide covering both for the mechanism and for the lever pivot pin holes 91 to restrain the pivot pins 59 from moving axially. Set screws 92 provide locking means for the pins 59.

Reference now to the sections shown in FIGS. 7 and 8 indicates that a detent pin 79 is provided in a bore 93 at the top of the link arc traversed by the translating jaws 35. This bore 93 slidably contains the cylindrical detent pins 79 which have keyways 80 provided therein, and set screws 94 are provided in the housing 17 to engage the keyways 80 to orient the detent pins 79. The detent pin 79 has a spring 95 at its inboard end 96 located in a pilot hole 97 in the pin 79 and the bore 93 is covered with a cover plate 98 held to the arm 15 by screws 99, which provides a thrust face for the spring 95 to react against. The substantially rectangular section of the jaws 35 depicted in FIG. 7 indicates that a slight taper 100 is provided at the topmost edge 101 of the jaws 35 parallel to the length, and a cooperating taper 102 is machined on the detent pin 79 at the point 103 at which the rectangular relief portion 104, provided in the detent pin 79 meets the outer circumference of the pin.

As shown in FIG. 7 when the detent release screw 33 has been struck, the detent pin 79 has been pushed to its retracted position, compressing the spring 95. When in this position, (that is, the "rest" position 26 of the arm), the jaws 35 may be free to move through the relief portion 104 of the detent pin 79 to clamp and unclamp the toolholder 39. After the jaws 35 clamp a toolholder 39, and the arm 15 is swung to a position away from the detent release screws 33, the detent pin 79 will slide in its bore 93 under the action of the spring 95 to the point where its taper 102 engages the mating taper 100 of the translated jaw 35 and thus establish a positive interference so that the jaw 35 cannot translate further; since it cannot move upward through the interfering detent pin. By this manner, a safety device is provided so the jaws 35 cannot move away from one another to release a toolholder 39.

FIG. 9 illustrates the configuration of the translatable jaw 35, showing that the jaw 35 is slidably maintained in a track 105 formed by a guide surface 106 on the housing 17 and a guide surface 107 on the jaw cover plate 108. A slot 109 is provided through the central portion of the translatable jaw 35, parallel to the guide surfaces 106,107 and in a close relationship thereto. The link pins 37,37a extend into the guide slot 109 where they fit closely with the walls of the slot 109. The nose portion 110 of the jaw 35 has an arcuate V-shaped surface 111 which fits into the V-groove 45 about the tool shank 46 to insure positive axial and radial positioning of the tool shank 46 during a tool change interval.

What is claimed is:

1. In an automatic tool changer utilized on machine tools and employing arms rotatably carried on a rotary trunion within said tool changer, an improved interchange arm, comprising in combination:
   a. a housing, journaled at one end about said rotary trunion;
   b. a key block, slidably maintained within a track along the centerline in said housing, wherein said key block can be moved with respect to said housing to an advanced position, proximate to a tool holder, and alternately retracted within said housing, and further wherein said key block is adapted to engage a tool holder at said advanced position to maintain orientation of the tool holder relative to said keyblock;
   c. a pair of jaws, disposed parallel to one another and equally disposed about the center line of said housing, said jaws slidable within said housing under the action of said keyblock;
   d. means to move said keyblock and said jaws simultaneously;
   e. biasing means to urge said keyblock to an advanced position towards a tool holder; and
   f. means adapted to drive said trunion and housing simultaneously in a first arcuate direction to a first position and further wherein said means is adapted to alternatively drive said trunion and said housing simultaneously in a second arcuate direction to a second position, wherein said housing is held stationary at said second position and said trunion is driven in said second arcuate direction through an overtravel increment, wherein said overtravel increment is converted into retraction movement of said keyblock and said jaws, overcoming said biasing means.

2. In an automatic tool changer utilized on a machine tools and employing arms rotatably carried on a rotary trunion in said tool changer, an improved interchange arm, comprising in combination:
   a. a housing, journaled at one end about said trunion;
   b. a pair of jaws, slidably maintained in the opposite end of said housing;
   c. two pairs of parallelogram links, each pair pivotally connected at one end to one of said jaws, and pivotally connected at the opposite end to said housing at said housing centerline;
   d. a keyblock slidably maintained in a track along the center line of said housing such that said key block can either be retracted into the envelope of said housing or advanced to extend from said housing toward a tool holder, and further wherein said key block is link-pinned through a slot in one of each of said pair of parallelogram links so that said keyblock and jaws move in unison;
   e. a nose portion on the outwardly extendable end of said keyblock capable of engaging a cooperating key way on a tool holder, and a lug portion on the inwardly extendable end of said key block;
   f. a spring, disposed between an inward wall of said housing and said inwardly extendable end of said key block, wherein said spring biases said key block outwardly toward said tool holder;
   g. a lever, having first and second ends, further having its mid-span pivotally mounted in said housing, wherein the first end of said lever engages said lug portion of said key block, and further wherein an actuating force and movement applied to the second end of said lever causes an opposite movement of said first end of said lever, driving said lug portions and said key block towards said inward wall of said housing, thereby overcoming said spring biasing force and retracting said key block into the envelope of said housing; and h. a pin secured to said rotary trunion, extending into said journaled housing, such that rotation of said rotary trunion causes said pin to act against a positive shoulder within said journaled housing, so that said housing and said trunion may be rotated together to lift a tool holder to a first position, and further wherein reverse movement applied to said rotary trunion causes said pin to act against a clevis pin, which thrusts against said second end of said lever to cause said housing and said rotary trunion to move in a arc simultaneously towards a tool holder pickup point wherein stop means are provided on said machine tool, to restrict further arcuate movement of said housing, while said rotary trunion moves in a still further overtravel increment, so that said pin drives said clevis pin against said second end of said lever, thereby retracting said keyblock through the interaction of said first end of said lever on said lug portion of said key block, retracting said jaws into said housing as said spring is compressed, overcoming its biasing tendency.

* * * * *